United States Patent [19]

Fujita et al.

[11] Patent Number: 5,073,787

[45] Date of Patent: Dec. 17, 1991

[54] THERMAL RECORDING METHOD, THERMAL RECORDING MEDIUM USED IN THE METHOD AND METHOD FOR PRODUCING THE THERMAL RECORDING MEDIUM

[75] Inventors: Minoru Fujita; Tadahide Sugimoto; Yutaka Takagi, all of Tokyo, Japan

[73] Assignee: Kyodo Printing Co., Ltd., Tokyo, Japan

[21] Appl. No.: 474,116

[22] PCT Filed: Aug. 25, 1989

[86] PCT No.: PCT/JP89/00871

§ 371 Date: Apr. 27, 1990

§ 102(e) Date: Apr. 27, 1990

[87] PCT Pub. No.: WO90/02046

PCT Pub. Date: Mar. 8, 1990

Related U.S. Application Data

[63] Continuation-in-part of Ser. No. 448,308, Dec. 11, 1989, Pat. No. 4,973,643.

[30] Foreign Application Priority Data

Aug. 30, 1988 [JP] Japan .............................. 63-213641

[51] Int. Cl.[5] .......................... G01D 9/00; B41M 5/28

[52] U.S. Cl. ................................ 346/135.1; 346/76 R

[58] Field of Search ...................... 346/134, 135.1, 136, 346/76 R, 76 PH

[56] References Cited

FOREIGN PATENT DOCUMENTS 0052390 3/1985 Japan .
0144086 6/1988 Japan .

*Primary Examiner*—Benjamin R. Fuller
*Assistant Examiner*—Huan Tran
*Attorney, Agent, or Firm*—Kane, Dalsimer, Sullivan, Kurucz, Levy, Eisele and Richard

[57] ABSTRACT

This invention provides a thermal recording medium which has a metallic thin layer, a heat sensitive layer formed on said metallic thin layer and a contrast layer formed on either said heat sensitive layer or the above metallic thin layer and visually contrasting with the above metallic thin layer.

A thermal recording medium having a roughed metallic thin layer can be produced by using a material containing minute particles to form a roughed heat sensitive layer or a roughed contrast layer prior to the formation of the metallic thin layer and depositing it on the roughed heat sensitive layer or the roughed contrast layer.

A desired pattern is thermally recorded by heating in said desired pattern the heat sensitive layer and the metallic thin layer of the above thermal recording medium to melt the heated areas of said metallic thin layer and disperse the molten metallic thin layer as fine particles into the heat sensitive layer touching said metallic thin layer thereby destroying it in the above desired pattern.

5 Claims, 4 Drawing Sheets

THERMAL RECORDING METHOD, THERMAL RECORDING MEDIUM USED IN THE METHOD AND METHOD FOR PRODUCING THE THERMAL RECORDING MEDIUM

BACKGROUND OF THE INVENTION

This invention relates to thermal recording, and more specifically, to a thermal recording method using physical changes and enabling stable recording while causing only minimal changes with the passing of time, a thermal recording medium used in the method and a method for producing said recording medium.

This invention can be effectively applied to printing figures and the like corresponding to the contents of magnetic recording in a prepaid magnetic card such as a telephone card to enable the magnetically recorded contents to be macroscopically seen.

Conventionally, there are two methods for recording information on a recording paper by heating the heating element of a thermal head at desired timing according to recording signals while scanning said thermal head over the recording paper. These methods consist of a heat transcription method in which a desired pattern is transcribed on a normal recording paper by heating and melting the ink of a heat sensitive ink ribbon which is interposed between a thermal head and the recording paper, and a thermal method in which a thermal recording paper is colored in a desired pattern.

Since ink is not applied to a recording paper and the heat sensitive layer of the recording paper itself is colored in the thermal method, this method is advantageous because the printed record is not affected almost entirely even when external frictional force is applied to the recording paper after recording. This method is advantageous also because no ink ribbons are necessary.

However, since a layer containing a heat sensitive color former is used as the heat sensitive layer of a recording paper used in the conventional thermal method and said heat sensitive layer is colored due to chemical changes of said color former during heating, sufficiently good quality of the printed record is difficultly obtained because the degree of coloring may vary depending on environmental conditions, and also the stability of recording is not sufficient yet.

SUMMARY OF THE INVENTION

In view of the above problems of the prior art, this invention aims to provide a novel thermal recording method enabling good quality of the printed record and good stability of recording, a novel thermal recording medium used in said method and a method for producing said recording medium.

According to this invention, the above objects are achieved by a thermal recording medium which has a metallic thin layer, a heat sensitive layer formed on said metallic thin layer and a contrast layer formed on either said heat sensitive layer or the above metallic thin layer and visually contrasting with the above metallic thin layer.

According to this invention, the above objects are achieved by a method for producing a thermal recording medium which is characterized by using a material containing minute particles to form a roughed heat sensitive or contrast layer before the formation of a metallic thin layer and depositing it on the roughed heat sensitive or contrast layer.

According to this invention, the above objects are achieved by a thermal recording method which is characterized by heating the heat sensitive and the metallic thin layers of the above thermal recording medium of this invention in a desired pattern to melt the heated areas of said metallic thin layer and disperse the molten metal as fine particles into the heat sensitive layer touching said metallic thin layer thereby destroying it in the above desired pattern.

DETAILED DESCRIPTION OF THE INVENTION

Figure 1:
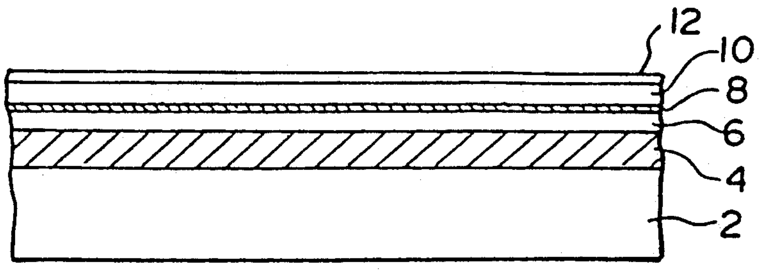
FIGS. 1, 4 and 5 are rough cross-sectional views of the main parts of thermal recording media of this invention.
Figure 2A:
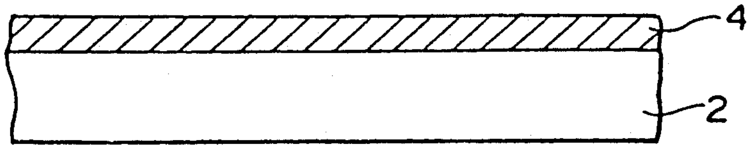
FIGS. 2(*a*)~(*e*) and FIGS. 7(*a*)~(*d*) indicate the production processes for thermal recording media of this invention.
Figure 2B:
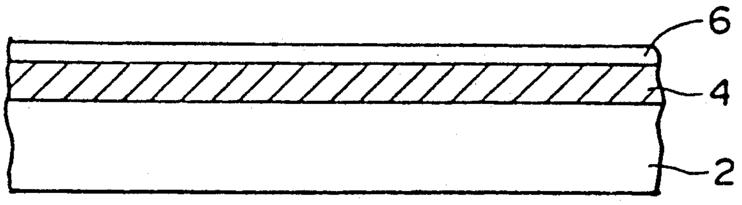
Figure 2C:
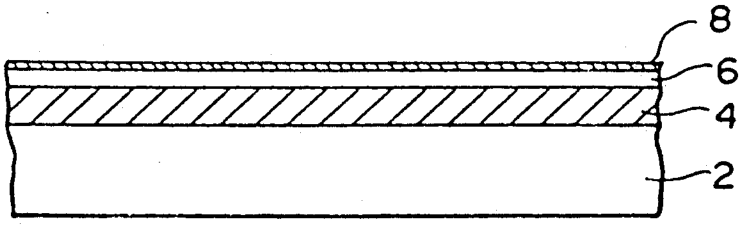
Figure 2D:
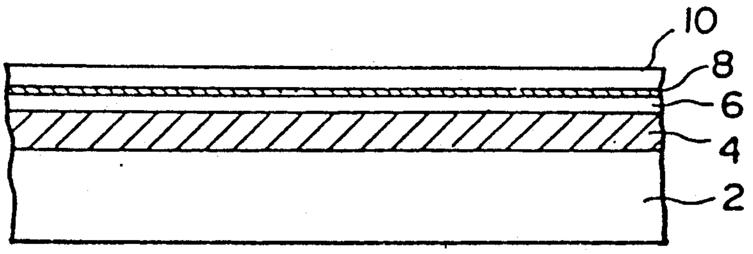
Figure 2E:
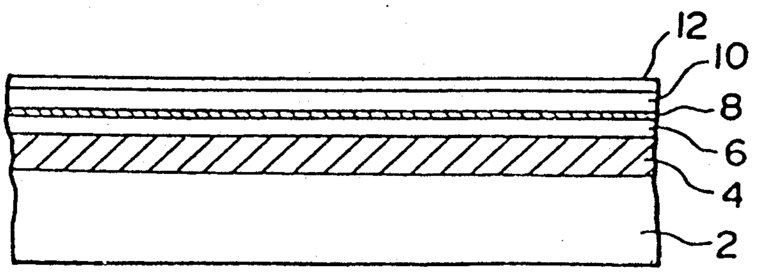

Examples of this invention will be explained while referring to the drawings in the following.

FIG. 1 is a rough cross-sectional view of the main part of an example of the thermal recording medium of this invention.

In FIG. 1, a contrast layer 4 is formed on the surface (upper surface) of a base 2, a first heat sensitive layer 6 is formed on the contrast layer 4, a metallic thin layer 8 is formed on the heat sensitive layer 6, a second heat sensitive layer 10 is formed on the metallic thin layer 8 and a wear-resistant layer 12 is formed on the heat sensitive layer 10.

For the above base 2, synthetic paper, sheets of synthetic resins such as polyethylene terephthalates, epoxy resins, polyvinyl chlorides and polycarbonates and similar materials can be used. Said base 2 can have a proper shape such as a card-like shape.

Any material visually contrasting with the above metallic thin layer 8 can be used as the above contrast layer 4. It is preferable that the contrast layer 4 have a dark color such as a black color because the metallic thin layer 8 generally has a whitish color. For example, a material prepared by mixing a pigment or a dye with desired color into a binder such as a polyester resin, an alkyd resin, a vinyl resin, a polyurethane resin or a mixture of at least two of these resins can be used to form the contrast layer 4. The thickness of said contrast layer 4 is 20 μm or less for example and preferably about 2~15 μm.

The above first and second heat sensitive layers 6 and 10 are provided in order to improve the writing and recording characteristics of the metallic thin layer 8 (sensitization effect) and to disperse and receive fine particles resulting from the material of the metallic thin layer molten during said writing. A material prepared by adding, according to necessity, a wax such as a paraffin wax, a microcrystalline wax, a synthetic oxidized wax, montan wax, Fischer-Tropsch wax, a low molecular weight polyethylene wax, a paraffin wax derivative, a montan wax derivative or a microcrystalline wax derivative, stearic acid, a stearate or the like used as an additive to reduce the viscosity of the material to a low melting point natural resin such as shellac, a rosin or a terpene resin, a synthetic resin such as a nitrocellulose resin, an acrylic resin, a polyester resin, a polyvinylchloride resin, a polyvinylidenechloride resin, a vinyl acetate resin, a polystyrene resin, a polybutyral resin or a polyolefin resin or a combination of at least two of these resins used as the main component can be used as a heat sensitive material for the heat sensitive layers 6 and 10. When said additive used to reduce the viscosity of the heat sensitive material is in a form of minute particles, said additive is dispersed in the main component. When said additive used to reduce the viscosity of the heat sensitive material is solid, said additive is mixed with the main component either by dissolving said additive in a solvent or by melting said additive by heating. When the heat sensitive material is applied as a coating to the metallic thin layer 8, a solvent not damaging the above metallic thin layer 8 and first heat sensitive layer 6 must be used for the second heat sensitive layer 10, and it is preferable that a solvent for the second heat sensitive layer 10 be properly selected from among solvents such as glycol ethers and alcohols. The thicknesses of said heat sensitive layers 6 and 10 are 10 μm or less for example and preferably about 0.5~5 μm.

The above metallic thin layer 8 covers the above contrast layer 4 and is used as a recording film. For a metallic material used to form the metallic thin layer 8, low melting point metals such as Sn, Bi, Se, Te, Zn, Pb, In, Cd and Tl as well as low melting point alloys containing these metals such as Pb-Sn and Bi-Sn can be used. The thickness of said metallic thin layer 8 is about 100~2,000 Å for example and preferably about 300~500 Å.

For the above wear-resistant layer 12, heat-resistant materials such as cellulose resins, urethane resins, polyester resins, vinyl resins, epoxy resins and acrylic resins can be used. To such a resin, a phthalic acid ester, an ester of fatty acid, an orthophosphoric acid ester or a similar compound can be added as a plasticizer and a low molecular weight polyethylene, oleylamide, stearylamide, a silicone or a similar compound can be added to give smoothness. In addition, when the resin is applied as a coating to the heat sensitive layer 10, a solvent not damaging the above heat sensitive layer 10 and metallic thin layer 8 must be used, and it is preferable that the solvent be properly selected from among solvents such as glycol ethers and alcohols. The amount of the solvent used can be reduced by employing an ultraviolet-ray-cured resin or an electron-ray-cured resin. An acrylic, epoxy, polyester or similar resin can be used as said ultraviolet-ray-cured resin. The thickness of said wear-resistant layer 12 is 10 μm or less for example and preferably about 1~5 μm.

FIGS. 2(*a*)~(*e*) indicate the production processes for such a thermal recording medium as mentioned above. A production example will be described according to these drawings in the following.

As shown in FIG. 2(*a*), a contrast layer 4 was formed on the surface of a white polyethylene terephthalate film 2 with 188 μm thickness. Said contrast layer was formed by

| | |
|---|---|
| Carbon black | 4 pwt |
| Vinylchloride acetate resin | 16 pwt |
| Methyl ethyl ketone | 40 pwt |
| Toluene | 40 pwt |

mixing and dispersing the above components using a ball mill for six hours to prepare a black coating and then applying the coating to the white polyethylene terephthalate film 2 using a bar coater #20 prior to drying the applied coating. The dry thickness of said contrast layer 4 and 5 μm.

Next, as shown in FIG. 2(*b*), a heat sensitive layer 6 with 2 μm thickness was formed on the contrast layer 4. Said heat sensitive layer 6 was formed by

| | |
|---|---|
| Transparent dried white lac resin | 20 pwt |
| Ethanol | 80 pwt |

preparing a coating of the above composition and then applying the coating to the contrast layer 4 using a bar coater #14 prior to air-drying the applied coating.

Next, as shown in FIG. 2(*c*), an Sn thin layer 8 with 400 Å thickness was formed on the heat sensitive layer 6 at a rate of 5 Å/sec. by vacuum evaporation coating under a reduced pressure of $5\times10^{-5}$ Torr.

Next, as shown in FIG. 2(*d*), a heat sensitive layer 10 with 2 μm thickness was formed on the Sn thin layer 8 in the same manner as in the above process of FIG. 2(*b*).

Next, as shown in FIG. 2(*e*), a wear-resistant layer 12 with 1 μm thickness was formed on the heat sensitive layer 10. Said wear-resistant layer was formed by applying a thermosetting polyester resin coating containing a glycol ether as the solvent (1836T-N; manufactured by Fujikura Kasei Co., Ltd.) to the heat sensitive layer 10 using a bar coater #7 and then heating the applied coating at 80° C. for 30 minutes.

A thermal recording medium shown in FIG. 1 was obtained by the method described above.

The above heat sensitive layer 6 may be formed by

| | |
|---|---|
| Ethylene-vinyl acetate copolymer (Content of vinyl acetate, 55 wt %) | 8 pwt |
| Hydrogenated terpene resin | 8 pwt |
| Fischer-Tropsch wax | 4 pwt |
| Toluene | 80 pwt |

applying a coating prepared by mixing the above components to the contrast layer 4 using a bar coater #14 and then air-drying the applied coating.

In addition, the above heat sensitive layer 6 may be formed by

| | |
|---|---|
| Vinylidene chloride resin | 20 pwt |
| Methyl ethyl ketone | 20 pwt |
| Toluene | 20 pwt |
| Cyclohexanone | 40 pwt |

using a coating prepared by mixing the above components and the above heat sensitive layer 10 may be formed by

| | |
|---|---|
| Vinyl acetate resin | 20 pwt |
| Methanol | 80 pwt |

using a coating prepared by mixing the above components.

The surface of the above heat sensitive layer 6 can be roughed by mixing a low molecular weight polyethylene powder into the coating during the formation of the heat sensitive layer 6. That is to say, when said heat sensitive layer 6 has been roughed, a metallic thin layer 8 is easily roughed during its formation in the following process and as the result diffuse reflection by said metallic thin layer is increased, homogeneous white is obtained, the contrast between the metallic thin layer 8 and the contrast layer 4 is further improved and visible patterns can be easily seen macroscopically. For this purpose, the surface roughness (Ra in JIS B 0601) of the metallic thin layer 8 is 0.1~2.0 μm for example and preferably 0.3~1.0 μm. A polyimide resin powder, a low molecular weight tetrafluoroethylene resin powder, calcium stearate, tin stearate, a polystyrene latex, bentonite, wollastonite, talc, aluminum silicate, sericite, kaolin clay, white carbon, calcium carbonate, chalk, slaked lime, dolomite powder, magnesium carbonate, barium sulfate or a similar substance can also be used as minute particles for roughing the heat sensitive layer 6. The mean particle size of said minute particles is 0.3~10 μm for example and preferably 0.6~5.0 μm. Fifty parts by weight or less preferably 20 parts by weight or less of said minute particles are used for 100 parts by weight of the resin.

Figure 3:
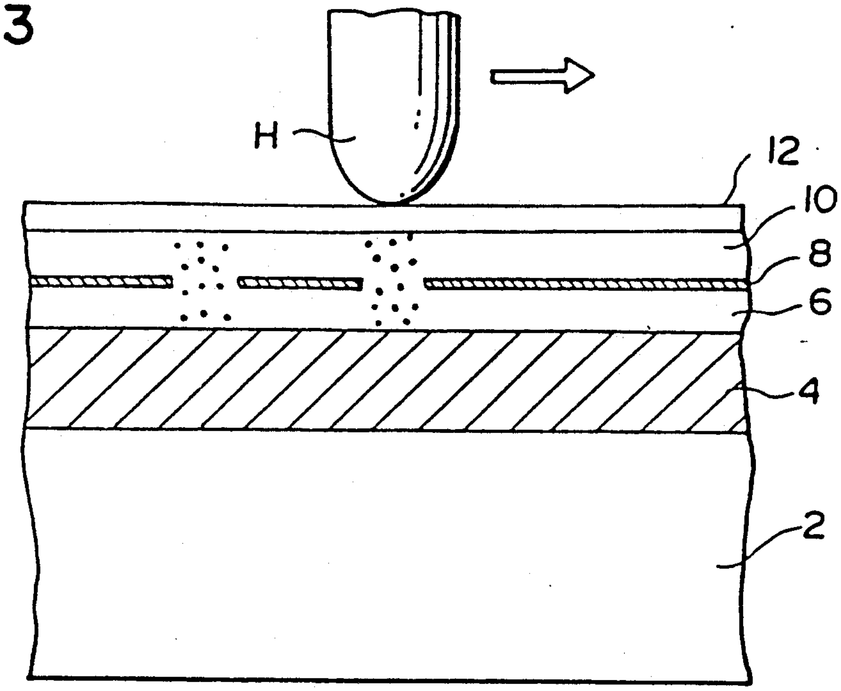
FIG. 3 is a rough cross-sectional view for explaining a method for recording in the thermal recording medium of this invention.

FIG. 3 is a rough cross-sectional view for explaining a method of recording in the thermal recording medium of this example mentioned above.

As shown in FIG. 3, when a thermal head H is scanned over the wear-resistant layer 12 in the direction indicated by the arrow while making the thermal head H touch the layer 12 and the heating element of said head H is heated at proper times, the heat sensitive layers 6 and 10 and the metallic thin layer 8 are molten by said heating and at this time fine particles resulting from the molten metallic thin layer 8 are dispersed in the molten heat sensitive layers 6 and 10 due to surface tension since the layer 8 is thin. In the portion where the material of the metallic thin layer 8 has been dispersed as fine particles, said metallic thin layer 8 has been destroyed and the heat sensitive layers 6 and 8 containing the dispersed fine particles solidify after the head H has passed over the portion thereby producing fixed record. The portion not having been heated by the heating of the above head H exhibits a whitish color because the metallic thin layer 8 remains as it is, while the portion having been heated by the heating of the above head H exhibits a blackish color of the contrast layer 4. Therefore, a visible pattern (information) is formed in a sufficient contrast. Although the dispersed fine particles exist in the heat sensitive layers 6 and 10 of the portion where the metallic thin layer 8 has been destroyed, macroscopic observation of the contrast layer 4 is not hindered because the amount of the dispersed fine particles is small.

Although the thermal head H is used as a means of heating in the above example, any other proper means of heating supplying heat equal to that supplied by the thermal head H and capable of similarly destroying the metallic thin layer 8 can be used in this invention.

Although the metallic thin layer 8 is interposed between the two heat sensitive layers 6 and 10 in the above example and this is favorable because the material of the metallic thin layer 8 heated by the thermal head H is very favorably dispersed as fine particles, the effect is obtained even when one of the heat sensitive layers 6 and 10 is omitted.

In this invention, a magnetic recording layer can be used as the contrast layer 4 and a card-like thermal recording medium with a given shape can be obtained by punching.

For said magnetic recording layer, those conventionally used as a magnetic recording layer in a magnetic recording medium can be used. For example, Ba-ferrite, Sr-ferrite, Co-coated $\gamma$-$Fe_2O_3$, $\gamma$-$Fe_2O_3$, needle-like iron powder or $CrO_2$ with particle size of 10 μm or less preferably 0.01~5 μm can be used as a magnetic material and a commonly used polyester, alkyd, vinyl or polyurethane resin or a mixture of at least two of these resins can be used as a binder resin. The ratio of the binder resin to the magnetic material is properly set by considering adhesiveness to the base, paint film strength, voltage detected by a magnetic head, and the like. The ratio by weight of the binder resin to the magnetic material can be in the range of 1/1~1/10 for example and is preferably $\frac{1}{2}\sim\frac{1}{8}$. The thickness of said magnetic recording layer is about 10~15 μm for example.

Such a card-like thermal recording medium also functioning as a magnetic recording medium as mentioned above can be used as a prepaid card. In such cases, thermal recording is effectively applied to printing records of card usage (dates and charges) and particulars of the remainder. Specifically, the remainder sum recorded in the magnetic recording layer of a prepaid card is revised every time of its use and the details are printed in the surface of said card by thermal recording to enable the user to always know the contents of said card.

It is preferable that the total thickness of the heat sensitive layer 6, the metallic thin layer 8, the heat sensitive layer 10 and the wear-resistant layer 12 be 10 μm or less in order to avoid a large distance between a magnetic head and the magnetic recording layer so that the thermal recording medium excellently functions as a magnetic recording medium.

In addition, in this invention, it is also possible to use a heat sensitive layer formed between the metallic thin layer and the base also as a contrast layer by making the color of said heat sensitive layer in a visual contrast with the metallic thin layer. In such cases, the contrast layer for exclusive use can be omitted.

Figure 4:
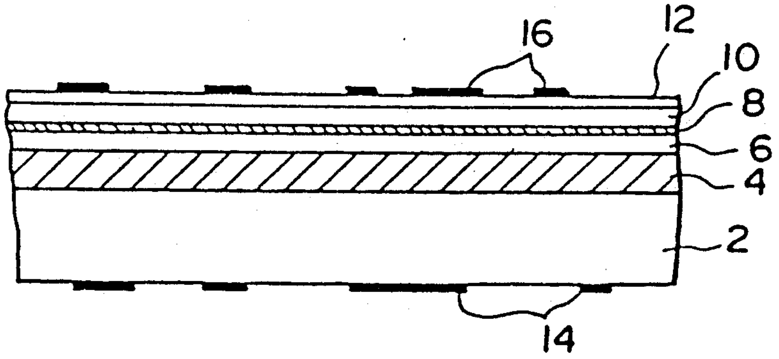
Figure 5:
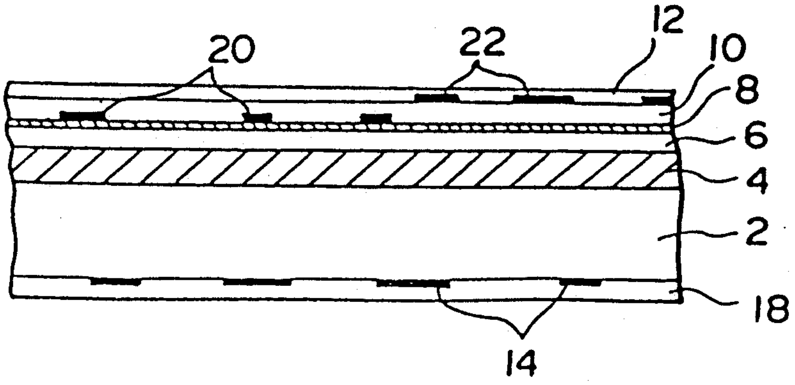

FIGS. 4 and 5 are rough cross-sectional views of the main parts of examples of the thermal recording medium of this invention. In these drawings, the same members as those shown in FIG. 1 are represented by the same symbols.

In the example shown in FIG. 4, a desired design 14 is printed on the surface of the base 2 opposite to the contrast layer 4, and a desired design 16 is also printed on the wear-resistant layer 12. The design 16 and visible patterns produced by the above thermal recording may synergistically form desired indications.

In the example shown in FIG. 5, a desired design 14 is printed on the surface of the base 2 opposite to the contrast layer 4 and the design 14 is covered by an over coat layer 18. A desired design 20 is printed on the metallic thin layer 8 and the heat sensitive layer 10 is formed over the design 20. In addition, a desired design 22 is printed on the heat sensitive layer 10 and the wear-resistant layer 12 is formed over the design 22. The designs 20 and 22 have the same effect as the above design 16.

Here, indications formed by the synergistic effect of a printed design and visible patterns produced by the above heat writing will be explained.

Figure 6A:
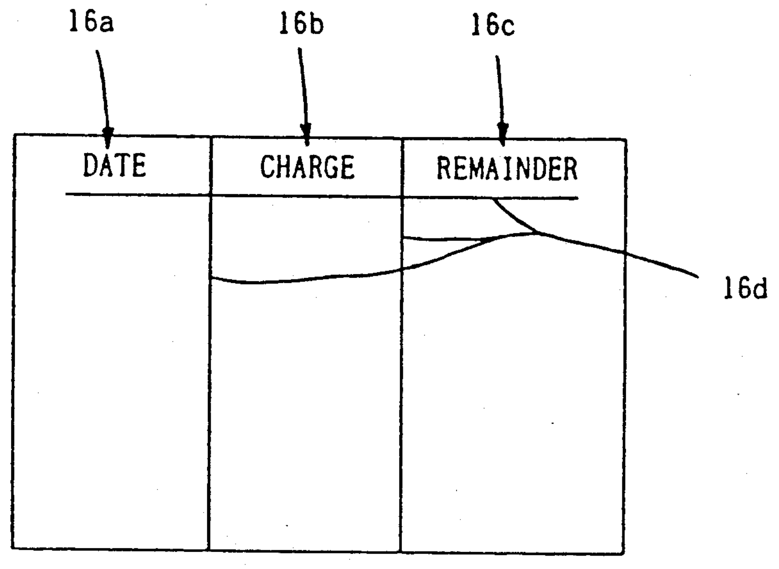
FIGS. 6(*a*) and (*b*) are plan views for explaining the formation of indications produced by writing visible patterns in the thermal recording medium of this invention.
Figure 6B:
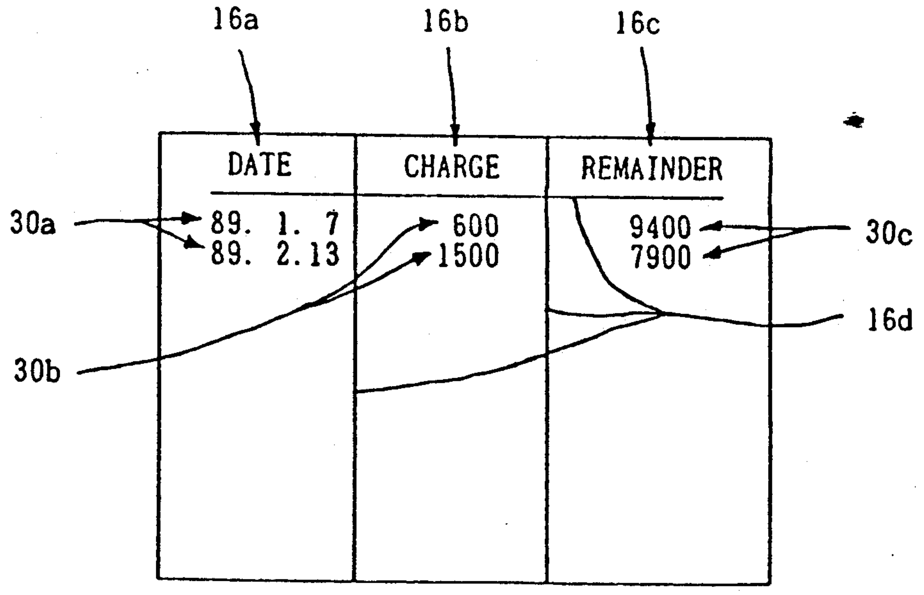
Figure 7A:
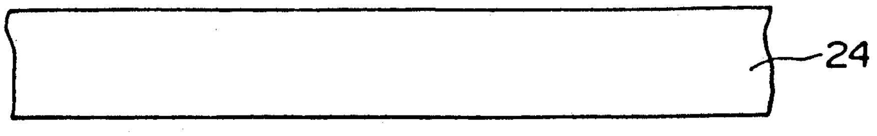
Figure 7B:
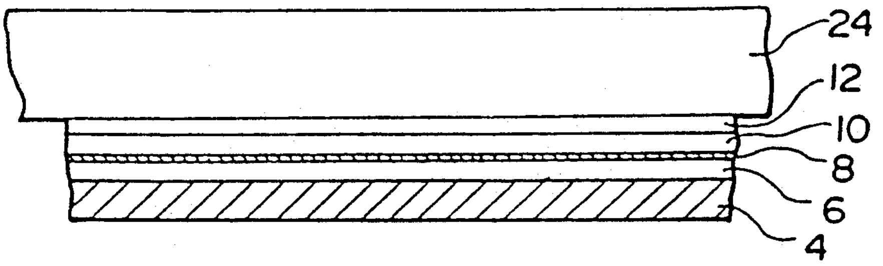
Figure 7C:
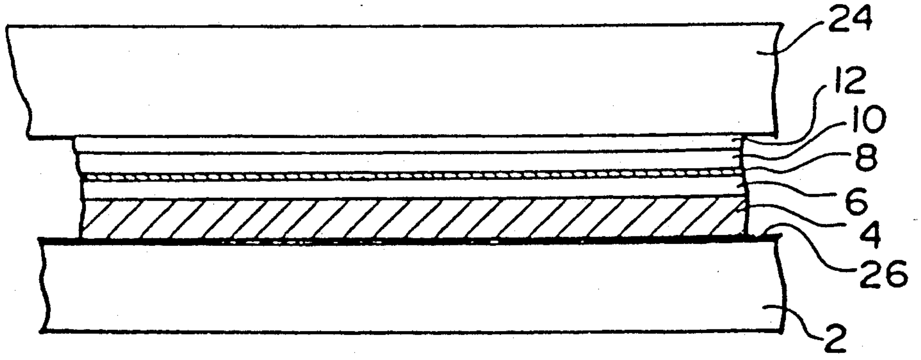
Figure 7D:
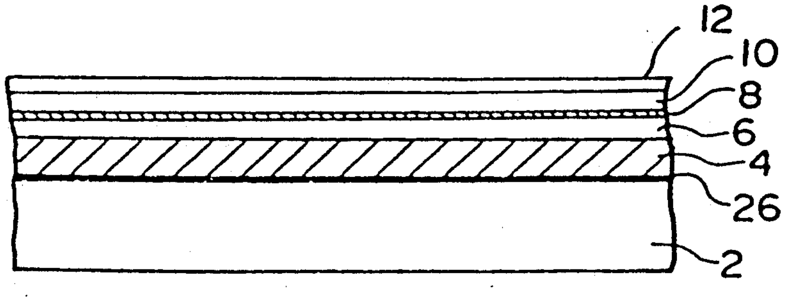

FIGS. 6(*a*) and (*b*) are plan views for explaining how indications are formed by writing visible patterns in a magnetic card wherein a magnetic recording layer is used as the contrast layer which is an example of the thermal recording medium of this invention.

FIG. 6(*a*) is an unused magnetic card on the surface of which "DATE" 16*a*, "CHARGE" 16*b*, "REMAINDER" 16*c* and lines 16*d* are previously formed as the above printed design 16.

FIG. 6(*b*) indicates a used magnetic card wherein the date of use 30*a*, the charge 30*b* and the remainder sum 30*c* are recorded in given positions corresponding to the above printed designs 16*a*, 16*b* and 16*c* by such visible pattern writing as explained according to FIG. 3.

FIGS. 7(*a*)~(*d*) indicate another example of the production processes for the thermal recording medium of this invention.

As shown in FIG. 7(*a*), a transfer sheet 24 one surface (lower surface) of which is a release surface is prepared.

Next, as shown in FIG. 7(*b*), a wear-resistant layer 12, a heat sensitive layer 10, metallic thin layer 8, a heat sensitive layer 6 and a contrast layer 4 explained according to FIG. 1 are formed in this order on the release surface of said transfer sheet. These layers are formed in the same manner as described according to FIGS. 2.

Next, as shown in FIG. 7(*c*), a base 2 is bonded to the contrast layer 4 by using an adhesive. The symbol 26 represents an adhesive layer.

Next, as shown in FIG. 7(*d*), the transfer sheet 24 is removed to obtain a thermal recording medium of the same structure as shown in FIG. 1.

According to the thermal recording of this invention mentioned above, since visible information can be recorded as a contrast between the metallic thin layer and the contrast layer by physically destroying said metallic thin layer partially according to a desired recording pattern, good quality of the printed record can be realized and the stability of recording is excellent.

What is claimed is:

1. A thermal recording medium comprising:

a base;

a magnetic recording layer disposed on said base, said magnetic recording layer serving as a contrast layer;

a first heat-sensitive layer disposed on said magnetic recording layer;

a metallic thin layer disposed on said first heat-sensitive layer;

a second heat-sensitive layer disposed on said metallic thin layer; and a wear-resistance layer disposed on said second heat-sensitive layer.

2. The thermal recording medium as set forth in claim 1, wherein a surface of said metallic thin layer is rough.

3. The thermal recording medium as set forth in claim 1, wherein said first heat-sensitive layer, said metallic thin layer, said second heat-sensitive layer and said wear-resistant layer have a total combined thickness of less than 10 μm.

4. A method for producing a thermal recording medium, said medium comprising a base, a magnetic recording layer disposed on said base, said magnetic recording layer serving as a contrast layer, a first heat-sensitive layer disposed on said magnetic recording layer, a metallic thin layer disposed on said first heat-sensitive layer, said metallic thin layer having a rough surface, a second heat-sensitive layer on said metallic thin layer, and a wear-resistant layer on said second heat-sensitive layer, comprising the steps of:

forming said first heat-sensitive layer with a rough surface by adding minute particles thereto during formation; and forming said metallic thin layer on said rough surface of said first heat-sensitive layer by deposition.

5. A method for using a thermal recording medium, said medium comprising a base, a magnetic recording layer disposed on said base, said magnetic recording layer having predetermined recorded contents and serving as a contrast layer, a first heat-sensitive layer disposed on said magnetic recording layer, a metallic thin layer disposed on said first heat-sensitive layer, a second heat-sensitive layer on said metallic thin layer, and a wear-resistant layer on said second heat-sensitive layer, comprising the step of:

recording on said thermal recording medium a visual pattern as information corresponding to at least a part of the contents recorded in said magnetic recording layer.

* * * * *